(12) United States Patent
Albrecht et al.

(10) Patent No.: US 11,143,200 B2
(45) Date of Patent: Oct. 12, 2021

(54) CONTROL APPARATUS FOR A HYDRAULIC VARIABLE-PITCH PROPELLER AND PROPELLER UNIT COMPRISING A CONTROL APPARATUS OF THIS KIND

(71) Applicant: MT-Propeller Entwicklung GmbH, Atting (DE)

(72) Inventors: Martin Albrecht, Straubing (DE); Gerd Muehlbauer, Mitterfels (DE)

(73) Assignee: MT-PROPELLER ENTWICKLUNG GMBH, Atting (DE)

( * ) Notice: Subject to any disclaimer, the term of this patent is extended or adjusted under 35 U.S.C. 154(b) by 167 days.

(21) Appl. No.: 16/154,090

(22) Filed: Oct. 8, 2018

(65) Prior Publication Data

US 2019/0136867 A1 May 9, 2019

(30) Foreign Application Priority Data

Oct. 9, 2017 (EP) .................................... 17195554

(51) Int. Cl.
*F04D 29/36* (2006.01)
*F15B 19/00* (2006.01)
(Continued)

(52) U.S. Cl.
CPC ............. *F04D 29/36* (2013.01); *B63H 3/082* (2013.01); *B64C 11/301* (2013.01); *B64C 11/40* (2013.01);
(Continued)

(58) Field of Classification Search
CPC .... F04D 29/36; F04D 27/001; F04D 15/0055; B63H 3/082; B64C 11/301; B64C 11/385; B64C 11/40; F15B 9/10
See application file for complete search history.

(56) References Cited

U.S. PATENT DOCUMENTS 3,143,925 A * 8/1964 Wolpin .................... B64C 13/00
91/367
3,261,406 A * 7/1966 Goodman ............... B64C 11/40
416/35
(Continued)

FOREIGN PATENT DOCUMENTS

DE 19600660 A1 7/1997
EP 2883788 B1 10/2018
GB 1422485 A 1/1976

*Primary Examiner* — Courtney D Heinle
*Assistant Examiner* — Andrew Thanh Bui
(74) *Attorney, Agent, or Firm* — Quarles & Brady LLP (57) ABSTRACT

The invention relates to a control apparatus for a hydraulic variable-pitch propeller (12) of an aircraft, land vehicle or water vehicle, comprising:
  a hydraulic oil feed line (24);
  a control line (16) which can be connected to the variable-pitch propeller (12);
  a pressure generating device (73) which is connected to the hydraulic oil feed line (24) and provides hydraulic oil with a basic pressure;
  a servo valve (78) which is arranged downstream of the pressure generating device (73), the input pressure to which servo valve is the basic pressure and the output pressure from which servo valve during normal operation defines a control pressure in the control line (16) and which servo valve is connected to a controller (28) which delivers a control signal for changing the control pressure; and
pressure reducing means which are arranged downstream of the servo valve (78) and upstream of the control line (16), which are mechanically actuated and which, in the event of a failure of the servo valve (78), change the control pressure in the control line (16).

13 Claims, 2 Drawing Sheets

(51) Int. Cl.

| | |
|---|---|
| *F04D 27/00* | (2006.01) |
| *F04D 15/00* | (2006.01) |
| *F15B 20/00* | (2006.01) |
| *F15B 9/10* | (2006.01) |
| *B64C 11/40* | (2006.01) |
| *B63H 3/08* | (2006.01) |
| *B64C 11/30* | (2006.01) |

(52) U.S. Cl.
CPC ....... *F04D 15/0055* (2013.01); *F04D 27/001* (2013.01); *F15B 9/10* (2013.01); *F15B 19/005* (2013.01); *F15B 20/004* (2013.01); *F15B 20/007* (2013.01); *B63H 2003/088* (2013.01)

(56) References Cited

U.S. PATENT DOCUMENTS

| | | | | |
|---|---|---|---|---|
| 4,076,096 | A | | 2/1978 | Hushower et al. |
| 4,588,354 | A | * | 5/1986 | Duchesneau ........... B64C 11/38 |
| | | | | 416/27 |
| 4,772,181 | A | * | 9/1988 | Poucher ................ B64C 11/306 |
| | | | | 416/127 |
| 5,037,271 | A | * | 8/1991 | Duchesneau ........... B64C 11/38 |
| | | | | 416/157 R |
| 5,897,293 | A | * | 4/1999 | Arel ...................... B64C 11/303 |
| | | | | 416/114 |
| 6,767,187 | B2 | * | 7/2004 | Franchet ............... F04D 29/362 |
| | | | | 416/157 R |
| 9,169,783 | B2 | * | 10/2015 | Kleckler ................... F02C 9/58 |
| 10,472,050 | B2 | * | 11/2019 | Futa, Jr. ................ B64C 11/385 |
| 2019/0031319 | A1 | * | 1/2019 | Calkins ................... B64C 11/44 |

* cited by examiner

CONTROL APPARATUS FOR A HYDRAULIC VARIABLE-PITCH PROPELLER AND PROPELLER UNIT COMPRISING A CONTROL APPARATUS OF THIS KIND

CROSS-REFERENCE TO RELATED APPLICATIONS

This application claims priority to European Patent Application No. EP 17195554.5 filed on Oct. 9, 2017. The contents of this application are hereby incorporated by reference as if set forth in their entirety herein.

The invention relates to a control apparatus for a hydraulic variable-pitch propeller of an aircraft, land vehicle or water vehicle and to a propeller unit comprising a control apparatus of this kind.

A control apparatus of this kind is known from practice and serves to set a pitch/setting angle of propeller blades of a hydraulic variable-pitch propeller. Said control apparatus comprises a servo valve which is arranged downstream of a pressure generating device and the input pressure to which servo valve is a basic pressure which is provided by the pressure generating device and the output pressure from which servo valve defines a control pressure in a control line which is connected to a pressure chamber of a hydraulic variable-pitch propeller. The hydraulic variable-pitch propeller comprises at least two propeller blades which are mounted in the region of a propeller hub and the pitch/setting angle of which propeller blades can be adjusted by means of a piston unit which is arranged in the propeller hub. The position of the piston unit is dependent on the hydraulic pressure prevailing in the pressure chamber. The pitch/setting angle of the propeller blades can be adjusted by means of the control or regulating pressure between a pitch/setting angle which is associated with a feathering position, at which pitch/setting angle the propeller blades provide the least air resistance during flight of the aircraft in question, a minimal pitch/setting angle which is provided to the aircraft in question for propulsion, and a negative pitch/setting angle which corresponds to a reverse thrust position of the propeller blades. In the reverse thrust position, the variable-pitch propeller therefore exerts a braking force on the aircraft while the rotation direction of the propeller remains the same. This braking force may be required after the aircraft touches down on a runway in order to shorten the braking distance of said aircraft.

It is necessary to secure the propeller unit in such a way that the reverse thrust position of the propeller blades cannot be set during flight of the aircraft.

The invention is based on the object of providing a control apparatus for a hydraulic variable-pitch propeller, which control apparatus has integrated means which firstly allow for adjustment of the pitch/setting angle of the propeller blades of the variable-pitch propeller by means of a servo valve but, in the event of a failure of the servo valve, reliably prevent the propeller blades from being adjusted to their reverse thrust position.

According to the invention, this object is achieved by the control apparatus having the features of patent claim 1.

Therefore, the invention proposes a control apparatus for a hydraulic variable-pitch propeller of an aircraft, land vehicle or water vehicle, comprising a hydraulic oil feed line, a control line which can be connected to the variable-pitch propeller, a pressure generating device which is connected to the hydraulic oil feed line and provides hydraulic oil with a basic pressure, a servo valve which is arranged downstream of the pressure generating device, the input pressure to which servo valve is the basic pressure and the output pressure from which servo valve during normal operation defines a control pressure in the control line and which servo valve is connected to a controller which delivers a control signal for changing the control pressure, and pressure reducing means which are arranged downstream of the servo valve and upstream of the control line, which are mechanically actuated and which, in the event of a failure of the servo valve, change the control pressure in the control line.

The control apparatus according to the invention consequently comprises mechanically actuated pressure reducing means which operate, for example, in a rotation speed-dependent manner and/or depending on a mechanically measured pitch/setting angle of the propeller blades and lower the control pressure in the control line during flight of the aircraft in the event of a failure of the servo valve on account of an increase in the rotation speed of the propeller or on account of a mechanically measured critical pitch/setting angle. Therefore, the pitch/setting angle of the propeller blades of the variable-pitch propeller can be adjusted in the direction of the feathering position by virtue of the action of forces which are exerted, for example, by a return spring arrangement and/or centrifugal weights. The control pressure in the control line therefore cannot increase to such an extent that the propeller blades are adjusted to their reverse thrust position without corresponding enabling. If the servo valve fails, the output pressure from said servo valve corresponds to the input pressure, that is to say to the basic pressure which is provided by the pressure generating device and counteracted by the pressure lowering device.

In a particular embodiment of the control apparatus according to the invention, the pressure reducing means comprise a pressure lowering device which is arranged downstream of the servo valve and upstream of the control line and, in the event of a failure of the servo valve, changes the control pressure in the control line depending on a rotation speed of the propeller.

In a preferred embodiment of the control apparatus according to the invention, the pressure lowering device, which forms a so-called overspeed governor, identifies that rotation speed of the propeller at which the control pressure in the control line has to be changed by means of a drive shaft which is coupled to a transmission of an engine of the variable-pitch propeller. The rotation speed at which the pressure lowering device lowers the control pressure in the control line is, for example, 103% of the rotation speed with which the propeller is operated during normal operation.

The pressure lowering device, which operates in a rotation speed-dependent manner, is, in particular, a valve comprising a valve slide, the position of which valve slide is defined by centrifugal weights which are driven by the drive shaft. When there is an increase in the rotation speed, the centrifugal weights shift the valve slide against the force of a pretensioning spring, so that the valve is moved to an open position and the control pressure in the control line is lowered.

In a further preferred embodiment of the control apparatus according to the invention, the pressure reducing means further comprise a safety valve which is arranged downstream of the servo valve and upstream of the control line. The safety valve prespecifies a limit pitch/setting angle of the propeller blades of the propeller and has an actuating member which is mechanically coupled to a mechanical pitch/setting angle detecting device which is operated at a pitch/setting angle of the propeller blades which lies below the minimum pitch/setting angle. The safety valve reduces the control pressure in the control line when the minimum pitch/setting angle of the propeller blades is undershot in the event of a fault. A fault is present, for example, when an electronic pitch/setting angle measuring device, which is coupled to the servo valve, fails, or the servo valve itself fails.

The mechanical pitch/setting angle detecting device can comprise a measuring lever which is preferably connected to a position measuring device which is, in particular, in the form of a travel measuring device, the measuring signal from which position measuring device is passed on to the controller. During normal operation, the controller outputs a regulating signal to the servo valve which sets the control pressure in the control line. However, if the position measuring device fails, no corresponding control signal can be generated. In this case, the safety valve intervenes when a limit pitch/setting angle of, for example, 14° is reached, the actuating member of which safety valve or the valve slide of which safety valve is connected to the measuring lever. The measuring lever is connected in an articulated manner, in particular, to a bearing point which is fixed to the aircraft and is connected to a blade angle measuring ring which is mechanically adjusted by a piston unit, which is arranged in the propeller and subjected to the action of the control pressure, when a minimum permissible propeller pitch/setting angle of, for example, 15° is undershot.

In order to be able to adjust the propeller blades of the hydraulic variable-pitch propeller to a reverse thrust position at all, a particular embodiment of the control apparatus according to the invention further has a reverse thrust enable valve (beta enable valve) which is connected to the pressure lowering device via a first feed line and is connected to the servo valve via a second feed line. In a first switching position of the reverse thrust enable valve, the first feed line is connected to the control line. Therefore, adjustment of the propeller blades to the reverse thrust position is blocked. In a second switching position, the servo valve is connected to the control line via the second feed line. Therefore, the pressure lowering device is rendered inoperative, that is to say a bypass which circumvents the pressure lowering device is implemented. Therefore, the propeller blades can be moved to their reverse thrust position by means of the servo valve.

In order to be able to move the propeller blades to their feathering position under the action of the return spring and possibly the centrifugal weights in the variable-pitch propeller in the case of a fault, the control apparatus according to the invention preferably additionally has an emergency pressure lowering valve (feathering valve) which is arranged upstream of the control line. When the emergency pressure lowering valve is switched or opened, the control pressure in the control line drops suddenly, so that the pressure in the pressure chamber of the variable-pitch propeller likewise drops and the return means of the variable-pitch propeller move the propeller blades to their feathering position.

In a preferred embodiment of the control apparatus according to the invention, at least the servo valve and the pressure lowering device are arranged in a housing. In addition, the housing can also accommodate the safety valve, the reverse thrust enable valve and/or the emergency pressure lowering valve.

The invention also relates to a propeller unit of an aircraft, land vehicle or water vehicle, comprising a hydraulic variable-pitch propeller with propeller blades, the pitch/setting angle of which propeller blades is hydraulically adjustable, and a control apparatus of the above-described type, and a controller for electronically actuating the servo valve depending on a rotation speed of the variable-pitch propeller.

Further advantages and advantageous refinements of the subject matter of the invention can be gathered from the description, the drawings and the patent claims.

One exemplary embodiment of a propeller unit according to the invention is illustrated in a schematically simplified manner in the drawings and will be explained in more detail in the following description.

Figure 1:
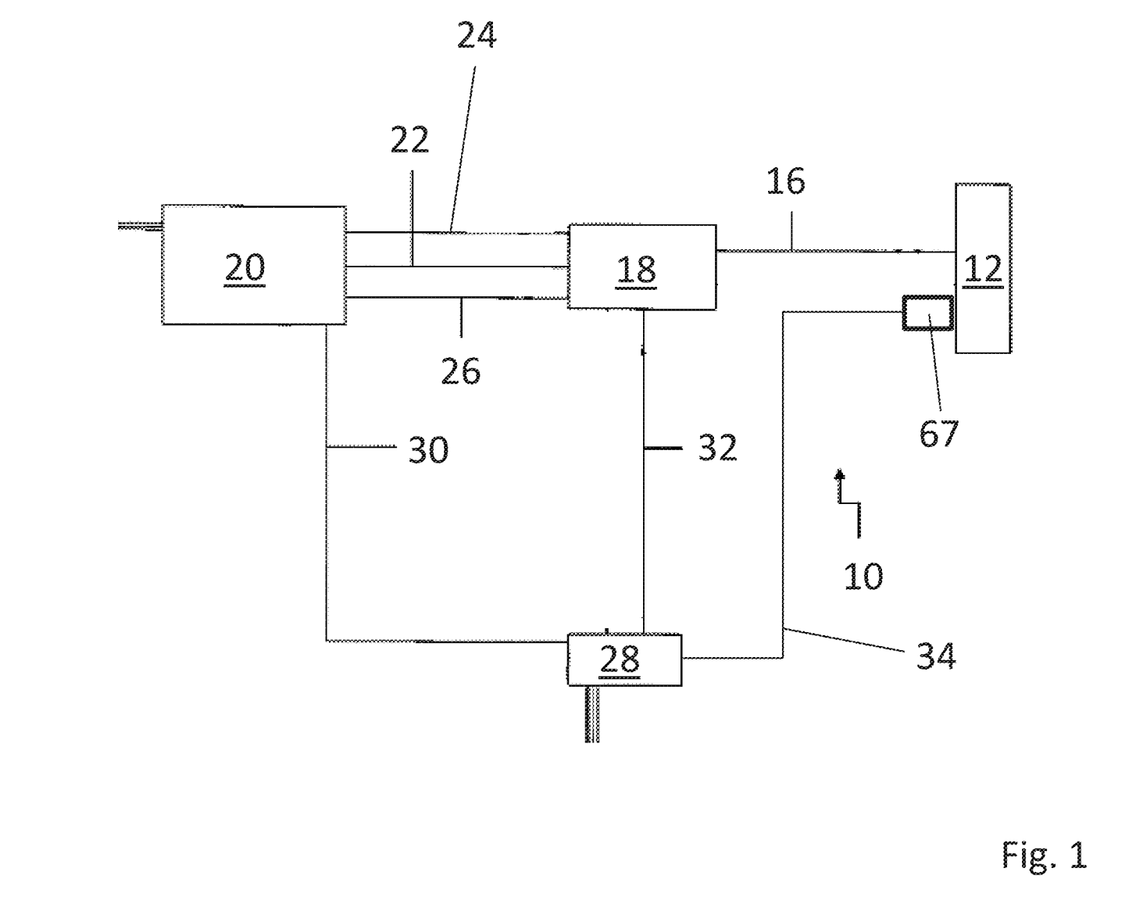
FIG. 1: shows a schematic arrangement of a propeller unit according to the invention.

FIG. 1 illustrates, in a highly schematic manner, a structure of a propeller unit 10 for an aircraft, which propeller unit forms a drive arrangement. The propeller unit 10 comprises a hydraulic variable-pitch propeller 12 which is illustrated on the basis of a longitudinal section in FIG. 2 and has propeller blades 14. The propeller blades 14, in respect of their pitch/setting angle or blade angle, can be hydraulically adjusted between a feathering position and a maximum reverse thrust position. In the feathering position, the propeller blades 14 provide the lowest possible air resistance. In the reverse thrust position, the propeller blades 14 have a braking effect on the aircraft, without the rotation direction of the variable-pitch propeller 12 having to be changed for this purpose.

In order to adjust the pitch/setting angle of the propeller blades 14, the variable-pitch propeller 12 is connected to a control apparatus 18 via a control line 16, it being possible for a control pressure which is provided to the variable-pitch propeller 12 and prevails in the control line 16 to be set by means of said control apparatus.

Furthermore, the propeller unit 10 comprises a drive 20 which, by means of a drive shaft 22 and a transmission, not illustrated in any detail, prespecifies the rotation speed with which the variable-pitch propeller 12 is driven. In addition, the drive 20 is connected to the control apparatus 18 via a hydraulic oil feed line 24 and a return line 26. These lines 24 and 26 serve to supply and to return a hydraulic oil which is required for setting the pitch/setting angle of the propeller blades 14.

The propeller unit 10 additionally comprises a controller 28 which can be a so-called "FADEC" (Full Authority Digital Engine Control). The controller 28 is connected to the drive 20 via a signal line 30, so that the controller 28 knows the respectively prevailing rotation speed with which the drive 20 is operating. In addition, the controller 28 is connected to the control apparatus 18 via a line 32, whereby the controller 28 can pass on control signals for setting the pitch/setting angle of the propeller blades 14 to the control apparatus 18. Furthermore, a measuring line 34 via which a measurement value of the pitch/setting angle of the propeller blades 14 is provided to the controller 28 during reverse thrust operation leads to the controller 28.

Figure 2:
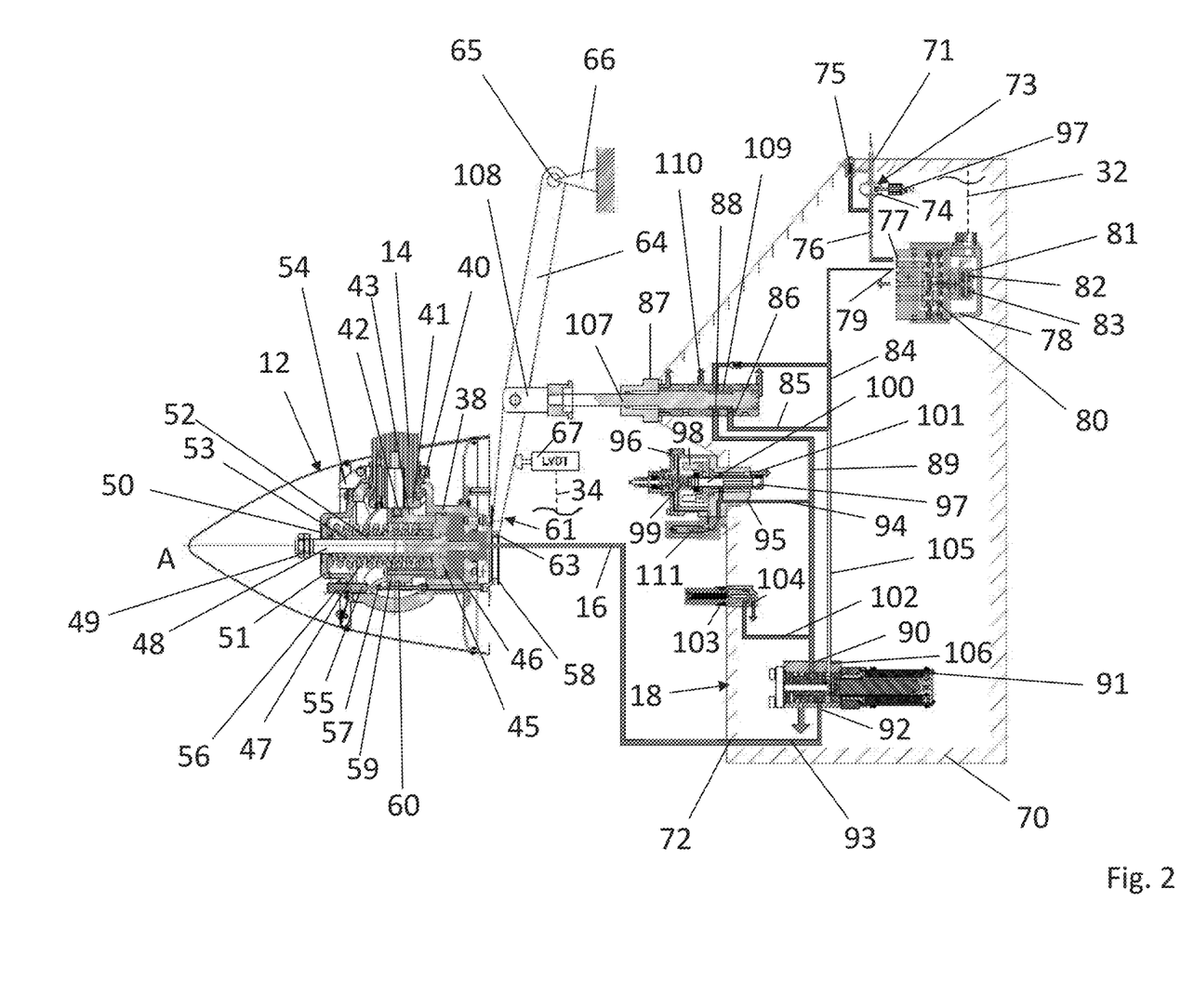
FIG. 2: shows a control apparatus of the propeller unit together with a hydraulic variable-pitch propeller.

The hydraulic variable-pitch propeller 12 comprises a propeller hub 38 on which the propeller blades 14 are mounted in a rotatable manner by means of blade bearings 40 for the purpose of setting the pitch/setting angle. The propeller blades 14 each have a propeller blade base 41, an adjusting pin 42 being arranged on the radially inwardly pointing end side of said propeller blade base and engaging into a corresponding recess of a movable sliding block 43 which is fastened to a piston unit 45 which borders a pressure chamber 46 in which the control pressure for adjusting the pitch/setting angle of the propeller blades 14 can be set by means of the control apparatus 18. The piston unit 45 is pretensioned by means of a return spring arrangement 47 in the direction of a position which corresponds to the feathering position of the propeller blades 14. The return spring arrangement 47 which is formed from compression springs engages around a central guide rod 48 which passes through the piston unit 45 and can be shifted together with said piston unit. At the end side, the guide rod 48 is provided with stop nuts 49, the inner of the stop nuts bearing against a corresponding mating stop 50 of a housing 51 of the propeller hub 38 in the feathering position.

The guide rod 48 is surrounded by a bushing 52 which, by way of one end side, is pressed against the piston unit 45 by the return spring arrangement 47 and, by way of its second end side 53, forms a stop which defines a maximum pitch/blade angle in a reverse thrust position of the propeller blades 14.

In the event of rotation of the variable-pitch propeller 12, that is to say during operation thereof, an adjusting moment is additionally exerted on the propeller blades 14 by centrifugal weights 54, which adjusting moment acts in the direction of the feathering position of said propeller blades.

In order to measure the pitch/setting angle or blade angle of the propeller blades 14 during reverse thrust operation, the variable-pitch propeller 12 has a blade angle position rod 55 which is displaceably mounted in a spring housing 56 and is prestressed in the direction of an inoperative position, illustrated in FIG. 2, in each case by means of a return spring which is arranged in the spring housing 56. The blade angle position rod 55 is connected, by way of its side which is averted from the return spring, to a blade angle measuring ring 58 which is arranged concentrically with respect to an axis A of the variable-pitch propeller 12 and it being possible to ascertain the pitch/setting angle of the propeller blades 14 by means of the axial position of said variable-pitch propeller during reverse thrust operation.

In order to shift the blade angle position rod 55 in the reverse thrust position of the propeller blades 14, a front piece 59 which engages around the blade angle position rod 55 by way of a fork piece 60 is arranged on the sliding block 43. In the feathering position of the propeller blades 14, the fork piece 60 is at a maximum distance from a stop nut 57 which forms a stop and is fitted onto the blade angle position rod 55. The stop nut 57 defines a stop for the piston unit 45 which is associated with a smallest possible pitch/setting angle of the propeller blades 14 during normal flight operation, which pitch/setting angle is 15° in the present case. If, starting from this stop position, the piston unit 45 is moved further against the force of the return spring arrangement 47 by increasing the pressure in the pressure chamber 46, and as a result the blade angle position rod 55 is shifted against the force of the return spring which is arranged in the spring housing 56, the propeller blades 14 are in a reverse thrust position. The associated pitch/setting angle of the propeller blades 14 is then detected by means of a pitch/setting angle detecting device 61 which is connected in a rotatable manner to the blade angle measuring ring 58 and comprises a measuring lever 64 which is connected in an articulated manner by means of a joint 63 and, by way of its end which is averted from the joint 63, is connected in an articulated manner to a bearing 66, which is fixed to the engine, by means of a joint 65. The measuring lever 64 is in turn connected to a travel measuring sensor 67 which is in the form of a so-called LVDT (Linear Variable Differential Transformer) and is connected to the controller 28 via the measuring line 34.

The pressure chamber 46 which is bordered by the piston unit 45 is connected to the control line 16 via which the pressure prevailing in the pressure chamber 46 is set, the pitch/setting angle of the propeller blades 14 in turn being defined by said pressure.

The control apparatus 18 for setting the control pressure in the control line 16 comprises a housing 70 which can be of integral or multipartite design and is provided with an inflow connection 71 for the hydraulic oil feed line 24 and a return connection, not illustrated in any detail, for the return line 26. In addition, the housing 70 has an output connection 72 for the control line 16, the control pressure being provided at said output connection.

Downstream of the inflow connection 71, the control apparatus 18 comprises a pressure generating device 73 which generates a constant basic pressure and comprises a gear pump 74 and a non-return valve 75. The gear pump 74 is driven by the drive 20 or a transmission thereof by means of a drive shaft 97.

On the downstream side, the gear pump 74 is connected to an input 77 of a servo valve 78 via a line 76, which servo valve is actuated by the controller 28 via the line 32. The servo valve 78 serves to set the control pressure in the control line 16 on the basis of the basic pressure provided by the pressure generating device 73. This control pressure is produced at an output 79 of the servo valve 78 during normal operation. The servo valve 78 has a valve element 80 for setting the control pressure, the position of which valve element defines the output pressure of the servo valve 78 and the position of which valve element is predefined by an electromagnetic unit 81 which comprises an electromagnetic main actuating device 82 and an electromagnetic reserve actuating device 83 which, in the event of a failure of the electromagnetic main actuating device 82, takes over the function of said electromagnetic main actuating device for operating the valve element 80.

The output 79 of the servo valve 78 is connected to an input 86 of a safety valve 87 via lines 84 and 85, the output 88 of which safety valve is connected via a line 89 to a first input 90 of a reverse thrust enable valve 91 which is in the form of a solenoid valve and the output 92 of which leads via a line 93 to the output connection 72 of the control apparatus 18. A line 105 which leads to a second input 106 of the reverse thrust enable valve 91 also branches off from the line 84.

A line 94 branches off from the line 89 downstream of the safety valve 87 and upstream of the reverse thrust enable valve 91, which line is connected to an input 95 of a pressure lowering device 96 which, in the event of a failure of the servo valve 78, changes the control pressure in the control line 16 depending on a rotation speed of the variable-pitch propeller 12. The pressure lowering device 96, which constitutes a valve, is driven by the drive shaft 97 which is coupled to the drive 20 or a transmission of the drive 20 and drives the centrifugal weights 98 which define the position of a valve slide 100 depending on the rotation speed of the drive shaft 97, a pretensioning spring 99 acting on said valve slide. Starting from a specific rotation speed, the centrifugal weights 98 adjust the valve slide 100 against the force of the pretensioning spring 99 to such an extent that the pressure lowering device 96 opens and enables a fluid flow from the input 95 to an output 101 of the pressure lowering device 96, which output leads to a hydraulic oil sump or the return line 26. Therefore, the pressure prevailing in the line 89 and therefore the pressure prevailing in the control line 16 can be lowered by way of opening the pressure lowering device 96.

Furthermore, the pressure lowering device 96 comprises a test valve 111 by means of which proper functioning of the pressure lowering device 96 can be checked.

In addition, a line 102 branches off from the line 89, which line 102 leads to a feathering position valve 103 which, when it is operated, can generate a spontaneous drop in pressure in the line 89 and the output 104 of which likewise leads to the return line 26 and therefore to the hydraulic oil sump. The feathering position valve 103, which therefore forms an emergency pressure lowering valve, is in the form of a simple solenoid valve.

The reverse thrust enable valve 91 has two switching positions. In a first switching position, in which the reverse thrust enable valve 91 is not energized, the first input 90 and therefore the line 89, which constitutes a first feed line, are connected to the output 92, so that adjustment of the propeller blades 14 to a reverse thrust position or to a corresponding pitch/setting angle is blocked. In a second switching position, in which the reverse thrust enable valve 91 is energized, the second input 106 is connected to the output 92. Therefore, the pressure prevailing in the control line 16 and in the pressure chamber 46 of the variable-pitch propeller 12 can be increased by means of the servo valve 78 via the line 84 and the line 105, which constitutes a second feed line of the reverse thrust enable valve 91, to such an extent that the propeller blades 14 can be turned to their reverse thrust position, so that they have a negative pitch/setting angle.

The safety valve 87 has a valve slide 107 which constitutes an actuating member and is connected to the measuring lever 64 via a connection piece 108. The valve slide 107 or the control groove 109 of said valve slide is designed, with respect to the input 86 and a return connection 110, such that, when a specific limit pitch/setting angle of 14° for example is reached, which pitch/setting angle is mechanically passed on to the valve slide 107 via the pitch/setting angle detecting device 61 and the connection piece 108, the hydraulic oil which is guided to the safety valve 87 in the line 85 is guided to the return connection 110 of the safety valve 87, as a result of which there is a drop in pressure in the line 89 and therefore the control pressure in the control line 16 also drops in the first switching position of the reverse thrust enable valve 91. Therefore, the propeller blades 14 are adjusted in the direction of their feathering position, that is to say the pitch/setting angle is increased, by the force of the return spring arrangement 47 and by the centrifugal weights 54.

The above-described propeller unit 10 operates in the manner described below.

During normal operation or during flight, the variable-pitch propeller 12 is driven at a constant rotation speed by means of the drive 20. The thrust which is exerted by the variable-pitch propeller 12 is set by means of the pitch/setting angle of the propeller blades 14. The pitch/setting angle is adjusted by means of the hydraulic oil pressure prevailing in the pressure chamber 46 or the control line 16. The hydraulic oil pressure is prespecified by the servo valve 78 of the control apparatus 18. During flight, the reverse thrust enable valve 91 is in its first switching position here, that is to say it connects the line 89, which constitutes a first feed line, to the control line 16, so that fluid flow between the line 105 and the output 92 of the reverse thrust enable valve 91 is blocked.

When the propeller blades 14, in respect of their pitch/setting angle, are intended to be moved to a reverse thrust position and therefore the hydraulic oil pressure in the pressure chamber 46 has to be correspondingly increased, the reverse thrust enable valve 91 is moved to the second switching position, as a result of which the line 105 is connected to the output 92 and the control line 16 and fluid flow between the first input 90 and the output 92 of the reverse thrust enable valve 91 is blocked. Here, the pitch/setting angle of the propeller blades 14 can be ascertained by means of the travel measuring sensor 67, the measurement value of which travel measuring sensor is provided to the controller 28. Said controller can, in turn, output corresponding control signals to the servo valve 78 via the line 32, as a result of which the pressure in the control line 16 can be changed. In the second switching position of the reverse thrust enable valve 91, the safety valve 87, the pressure lowering device 96 and the feathering position valve 103 are functionless, that is to say these are bypassed.

Particularly at a minimum pitch/setting angle of the propeller blades 14 of approximately 15°, the travel measuring sensor 67 transmits a corresponding signal to the controller 28, so that the pressure in the control line 16 can be reduced by means of the servo valve 78 and therefore adjustment of the propeller blades 14 to their reverse thrust position is prevented.

If the servo valve 78 fails, that is to say the two electromagnetic actuating devices 82 and 83 fail, the basic pressure which is generated by the pressure generating device 73 is produced at the output 79. In the first switching position of the reverse thrust enable valve 91, which first switching position is always applied during flight of the aircraft in question, the basic pressure would therefore be provided to the control line 16 and therefore to the pressure chamber 46 via the lines 84, 85, 89 and 93. This would in turn have the effect that the pitch/setting angle of the propeller blades 14 is adjusted in the direction of the reverse thrust position or even that the reverse thrust position would be set. This results in the rotation speed of the variable-pitch propeller 12 being increased by the initial reduction in the pitch/setting angle. The increase in rotation speed leads to an increase in the rotation speed of the drive shaft 97 of the pressure lowering device 96. When this rotation speed reaches a specific limit value, for example 103% of the maximum permissible rotation speed, the pressure lowering device 96 opens, as a result of which the pressure in the line 89 and therefore also in the line 93, the control line 16 and the pressure chamber 46 drops, this resulting in adjustment of the pitch/setting angle of the propeller blades 14 in the direction of the feathering position, that is to say toward larger pitch/setting angles. This in turn leads to a reduction in the rotation speed of the variable-pitch propeller 12 on account of the larger pitch/setting angle of the propeller blades 14.

In the event of a failure of the servo valve 78 and/or of the travel measuring sensor 67, the safety valve 87 prevents adjustment of the propeller blades 14 in the reverse thrust position. This is performed by the valve slide 107 of the safety valve 87 being operated by means of the blade angle position rod 55 and the blade pitch/setting angle detecting device 61 when a minimum pitch/setting angle of, for example, 15° is reached and therefore the safety valve 87 opening and the pressure in the line 89 and therefore the pressure in the line 93 and the control line 16 and the pressure chamber 46 falling when a limit blade pitch/setting angle of, for example, 14° is reached, this in turn causing adjustment of the propeller blades 14 in the direction of the feathering position, specifically until the measuring lever 64 has moved the valve slide 107 back to the closed position.

The pressure in the control line 16 is then kept substantially constant by way of an oscillating movement of the valve slide 107.

LIST OF REFERENCE SYMBOLS

10 Propeller unit
12 Hydraulic variable-pitch propeller
14 Propeller blade
16 Control line
18 Control apparatus
20 Drive
22 Drive shaft
24 Hydraulic oil feed line
26 line
28 Controller
30 Signal line
32 Line
34 Measuring line
38 Propeller hub
40 Blade bearing
41 Propeller blade base
42 Adjusting pin
43 Sliding block
45 Piston unit
46 Pressure chamber
47 Return spring arrangement
48 Guide rod
49 Stop nut
50 Mating stop
51 Housing
52 Bushing
53 End side
54 Centrifugal weight
55 Blade angle position rod
56 Spring housing
57 Stop nut
58 Blade angle measuring ring
59 Front plate
60 Fork piece
61 Pitch/setting angle detecting device
63 Joint
64 Measuring lever
65 Joint
66 Bearing
67 Travel measuring sensor
70 Housing
71 Inflow connection
72 Output connection
73 Pressure generating device
74 Gear pump
75 Non-return valve
76 Line
77 Input
78 Servo valve
79 Output
80 Valve element
81 Electromagnetic unit
82 Electromagnetic main actuating device
83 Electromagnetic reserve actuating device
84 Line
85 Line
86 Input
87 Safety valve
88 Output
89 First feed line
90 First input
91 Reverse thrust enable valve
92 Output
93 Line
94 Line
95 Input
96 Pressure lowering device
97 Drive shaft
98 Centrifugal weights
99 Pretensioning spring
100 Valve slide
101 Output
102 Line
103 Feathering position valve
104 Output
105 Line
106 Second input
107 Valve slide
108 Connection piece
109 Control groove
110 Return connection
111 Test valve
A Axis

The invention claimed is:

1. A propeller unit of an aircraft, land vehicle or water vehicle, comprising a drive, a hydraulic variable-pitch propeller with propeller blades, the pitch/setting angle of the propeller blades is hydraulically adjustable, and a control apparatus, and a controller for electronically actuating a servo valve depending on a rotation speed of the variable-pitch propeller, wherein the controller is a full authority digital engine control which controls the servo valve depending on a rotation speed of the variable pitch propeller, wherein the controller is connected to the drive via a signal line, so that the controller knows the rotation speed with which the drive is operating, wherein the controller is connected to the servo valve via a line for setting a pitch of the propeller blades, wherein the control apparatus comprises:
a hydraulic oil feed line;
a control line which can be connected to the variable-pitch propeller;
a pressure generating device which is connected to the hydraulic oil feed line and provides hydraulic oil with a basic pressure;
the servo valve includes a valve element comprising an electromagnetic main actuating device and an electromagnetic reserve actuating device arranged downstream of the pressure generating device, the input pressure to the servo valve is the basic pressure and the output pressure from the servo valve during normal operation defines a control pressure in the control line and the servo valve is connected to the controller which delivers a control signal for changing the control pressure, wherein the position of the valve element defines the output pressure of the servo valve, and wherein the reserve actuating device, in the event of a failure of the main actuating device, takes over the function of said main actuating device for operating the valve element;
a travel measuring sensor connected to the controller via a measuring line providing a measurement value of the pitch to the controller; and
pressure reducing elements which are arranged downstream of the servo valve and upstream of the control line, which are mechanically actuated and which, in the event of a failure of the servo valve, change the control pressure in the control line.

2. The propeller unit as claimed in claim 1, wherein the pressure reducing elements comprise a pressure lowering device which, in the event of a failure of the servo valve, changes the control pressure in the control line depending on a rotation speed of the propeller.

3. The propeller unit as claimed in claim 2, wherein the pressure lowering device has a drive shaft which is coupled to a transmission of a drive of the variable-pitch propeller.

4. The propeller unit as claimed in claim 3, wherein the pressure lowering device has a valve slide, the position of which valve slide is defined by centrifugal weights which are driven by the drive shaft.

5. The propeller unit as claimed in claim 1, wherein the pressure reducing elements comprise a safety, which has an actuating member which is mechanically coupled to a mechanical pitch/setting angle detecting device, the actuating member being operated at a pitch/setting angle of the propeller blades which lies below a minimum pitch/setting angle, wherein the safety valve lowers the control pressure in the control line when a limit pitch/setting angle of the propeller blades is reached in the event of a fault.

6. The propeller unit as claimed in claim 5, wherein the mechanical pitch/setting angle detecting device comprises a measuring lever which is preferably connected to a position measuring device, the measuring signal from the position measuring device is passed on to the controller and which position measuring device is, in particular, a travel measuring sensor.

7. The propeller unit as claimed in claim 1, wherein the pressure reducing elements are connected, on the downstream side, to a reverse thrust enable valve via a first feed line, the reverse thrust enable valve is connected to the servo valve via a second feed line, where, in a first switching position of the reverse thrust enable valve, the first feed line is connected to the control line and adjustment of the propeller blades to a reverse thrust position is blocked and, in a second switching position of the reverse thrust enable valve, the second feed line is connected to the control line and adjustment of the propeller blades to the reverse thrust position by means of the servo valve is enabled.

8. The propeller unit as claimed in claim 1, further comprising an emergency pressure lowering valve which is arranged upstream of the control line.

9. The propeller unit as claimed in claim 1, wherein the servo valve and the pressure reducing elements are arranged in a housing.

10. The propeller unit as claimed in claim 7, wherein the reverse thrust enable valve is arranged in a housing.

11. The propeller unit as claimed in claim 8, wherein the emergency pressure lowering valve is arranged in a housing, and wherein the servo valve and the pressure reducing elements are arranged in the housing.

12. The propeller unit as claimed in claim 8, wherein the emergency pressure lowering valve is arranged in a housing, and wherein the servo valve and the pressure reducing elements are arranged in the housing.

13. The propeller unit as claimed in claim 8, wherein the emergency pressure lowering valve is arranged in a housing and wherein the pressure reducing elements are connected, on the downstream side, to a reverse thrust enable valve via a first feed line, the reverse thrust enable valve is connected to the servo valve via a second feed line, where, in a first switching position of the reverse thrust enable valve, the first feed line is connected to the control line and adjustment of the propeller blades to a reverse thrust position is blocked and, in a second switching position of the reverse thrust enable valve, the second feed line is connected to the control line and adjustment of the propeller blades to the reverse thrust position by means of the servo valve is enabled.

\* \* \* \* \*

UNITED STATES PATENT AND TRADEMARK OFFICE
CERTIFICATE OF CORRECTION

PATENT NO. : 11,143,200 B2  
APPLICATION NO. : 16/154090  
DATED : October 12, 2021  
INVENTOR(S) : Martin Albrecht et al.

It is certified that error appears in the above-identified patent and that said Letters Patent is hereby corrected as shown below:

In the Specification

Column 9, Line 15, "26 line" should be --26 Return line--.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*